United States Patent [19]
Kawanami

[11] Patent Number: 5,899,586
[45] Date of Patent: May 4, 1999

[54] AUTOMATIC FOCUSING DEVICE AND OPTICAL APPARATUS HAVING THE SAME

[75] Inventor: Akihiro Kawanami, Tokyo, Japan

[73] Assignee: Canon Kabushiki Kaisha, Tokyo, Japan

[21] Appl. No.: 08/788,672

[22] Filed: Jan. 24, 1997

[51] Int. Cl.$^6$ .................................................. G03B 13/36
[52] U.S. Cl. ............................................................ 396/103
[58] Field of Search ............................... 396/103; 348/347

[56] References Cited

U.S. PATENT DOCUMENTS

| 4,611,244 | 9/1986 | Hanma et al. | 348/347 |
| 5,061,954 | 10/1991 | Toyama et al. | 396/103 |

*Primary Examiner*—W. B. Perkey
*Attorney, Agent, or Firm*—Robin, Blecker & Daley

[57] ABSTRACT

A focus adjusting apparatus comprises a motor serving as a drive source, a focusing unit which is driven by the motor and has at least a focusing lens, a focus detecting device which performs focus detection, an area setting device which sets a first area and a second area in an area in which the focusing unit is movable, a position detecting device which detects whether the focusing unit is located within the first area, and a motor control device which, when the focusing unit is located within the first area and the first area and the second area are set by the area setting device, forcibly drives the motor until the focusing unit moves out of the first area, and, then, drives and controls the motor on the basis of a result of focus detection performed by the focus detecting device in such a manner that the focusing unit performs a focus adjusting operation within the second area.

9 Claims, 6 Drawing Sheets

| DISTANCE LIMIT SWITCH | MOVING RANGE OF FOCUSING LENS |
|---|---|
| OFF | WHOLE AREA BETWEEN NEAREST DISTANCE END AND INFINITY DISTANCE END |
| ON | B ZONE ONLY |

PRIOR ART

AUTOMATIC FOCUSING DEVICE AND OPTICAL APPARATUS HAVING THE SAME

BACKGROUND OF THE INVENTION

1. Field of the Invention

This invention relates to an optical apparatus having an automatic focusing device arranged to set a movement inhibiting area within a moving range of a focusing lens.

2. Description of Related Art

It was generally practiced in the past to manually bring a lens into focus on an object to be photographed in taking a shot with a camera. During recent years, however, most of cameras or lenses have come to be arranged to automatically make focus adjustment by driving focusing lenses with actuators such as DC and ultrasonic motors or the like mounted in the cameras or lenses. The automatic focus adjustment (automatic focusing) enhances focusing accuracy and shortens to a great extent a length of time required in focusing to enable everyone to easily take a sharp picture without missing shutter operating opportunities.

However, the time required for focusing varies depending on various conditions and parameters. For example, a relatively long time is required in moving a focusing lens when the moving area of the focusing lens is wide depending on the focal length of the lens. Further, the focusing time is not always short depending on parameters such as luminance of the photographing object obtained by a distance measuring sensor, a perspective relation of a main object to peripheral objects, the focusing sensitivity of the lens, the relation of the current lens position to that of the photographing object, etc. Further, the lens might be focused on a wrong object when objects located at different distances appear together in the same field at far and near distances in a commingling state. This state is called "a far-and-near-distance competing state".

To solve this problem, in U.S. Pat. No. 4,284,335, there is disclosed a camera, which is arranged to permit selection of any object as desired, to set a distance measurement inhibiting zone within the whole distance measuring area of a distance measuring sensor and to inhibit any focusing action within the distance measurement inhibiting zone.

In another prior art of lenses, there is a lens system arranged to divide a moving area of a focusing lens between a nearest distance end position and an infinity distance end position into two areas, i.e., a movement allowing area and a movement inhibiting area, and to limit a moving range of the focusing lens by judging the moving direction indicated by an instruction coming from the camera to move the focusing lens. This enables the lens to quickly carry out automatic focusing control.

Figure 6:
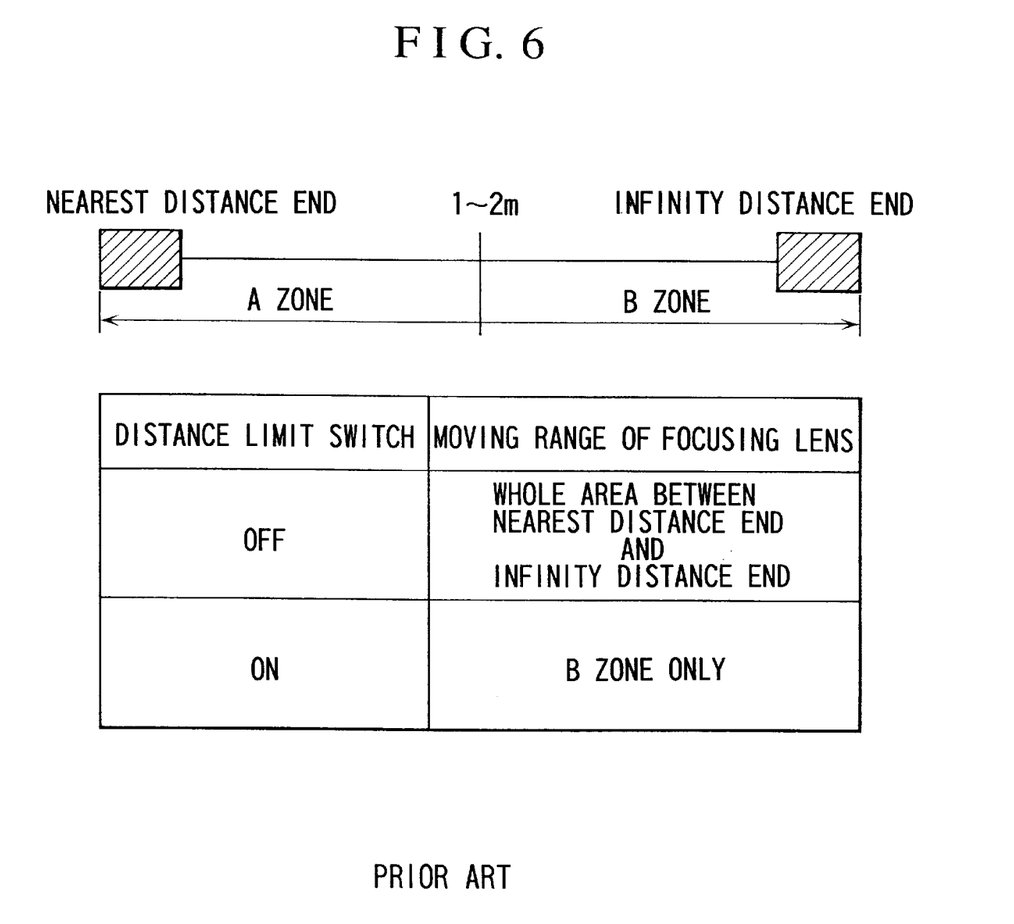
FIG. 6 is a diagram for explaining the conventional method for limiting a moving range of a focusing lens.

FIG. 6 is a diagram for explaining the conventional method for limiting a moving range of a focusing lens.

Referring to FIG. 6, the whole area of a moving range of the focusing lens is an area between a nearest distance end position and an infinity distance end position. The lens of the automatic focusing type is provided with a position detecting means for detecting the absolute position of the focusing lens and a distance limit switch for designating a moving area.

When the distance limit switch is in its off-state, the movable range of the focusing lens becomes the whole area (an A zone and a B zone). When the distance limit switch is in its on-state, the movable range of the focusing lens becomes the B zone only.

In a case where the distance limit switch changes from an off-state to an on-state while the absolute position of the focusing lens is in the B zone, the focusing lens becomes movable within the B zone only. In other words, in this case, the focusing lens is inhibited from entering the A zone. In this case, a photographing object desired is naturally located within the B zone in general and the lens is effectively prevented from being focused on a wrong object.

Further, if the distance limit switch changes from an off-state to an on-state while the focusing lens is in the A zone, the focusing lens can be moved by either of the following two methods. According to a first method, while the focusing lens is in the A zone, the focusing lens can not be driven by an automatic focusing action and must be moved to the B zone by a manual operation by the operator. According to a second method, while the focusing lens is in the A zone, the distance limit switch is considered to be in its off-state, even if the distance limit switch is actually in its on-state. Then, the focusing lens is driven to move to the B zone and, once the focusing lens enters the B zone, the distance limit switch is completely turned on to make it impossible for the focusing lens to return to the A zone.

However, in accordance with the first method, shutter operating opportunities might be missed, because the manual operation required cannot be carried out fast enough. In accordance with the second method, if the focusing action happens to encounter any focusable object other than a desired object during the process of moving the focusing lens to the B zone, the focusing action might be performed on the wrong object. As a result, the time required in bringing the focusing lens to the B zone becomes longer than a length of time normally required.

BRIEF SUMMARY OF THE INVENTION

In accordance with one aspect of this invention, there is provided a focus adjusting apparatus capable of setting, in a movable area of a focusing unit, a first area which is an area excluded from being subjected to a focus adjusting operation and a second area which is an area subjected to the focus adjusting operation, in which, when the focusing unit is located within the first area and the first area and the second area are set, a motor for driving the focusing unit is forcibly driven until the focusing unit moves out of the first area, whereby the focus adjusting operation can be quickly carried out even when the first and second areas are set while the focusing unit is located within the first area.

In accordance with another aspect of this invention, there is provided a focus adjusting apparatus capable of setting, in a movable area of a focusing unit, a first area which is an area excluded from being subjected to a focus adjusting operation and a second area which is an area subjected to the focus adjusting operation, in which, when the focusing unit is located within the first area and the first area and the second area are set, a motor serving as a drive source for driving the focusing unit is driven on the basis of a result of focus detection so that the focusing unit moves out of the first area, and, when the focusing unit has moved out of the first area, the motor is stopped and, then, the motor is driven on the basis of a result of focus detection so that the focusing unit performs the focus adjusting operation within the second area, whereby the focus adjusting operation can be quickly carried out even when the first and second areas are set while the focusing unit is located within the first area.

These and other aspects and features of this invention will become apparent from the following detailed description of preferred embodiments thereof taken in connection with the accompanying drawings.

DETAILED DESCRIPTION OF THE INVENTION

Preferred embodiments of this invention will be described in detail with reference to the drawings.

Figure 1:
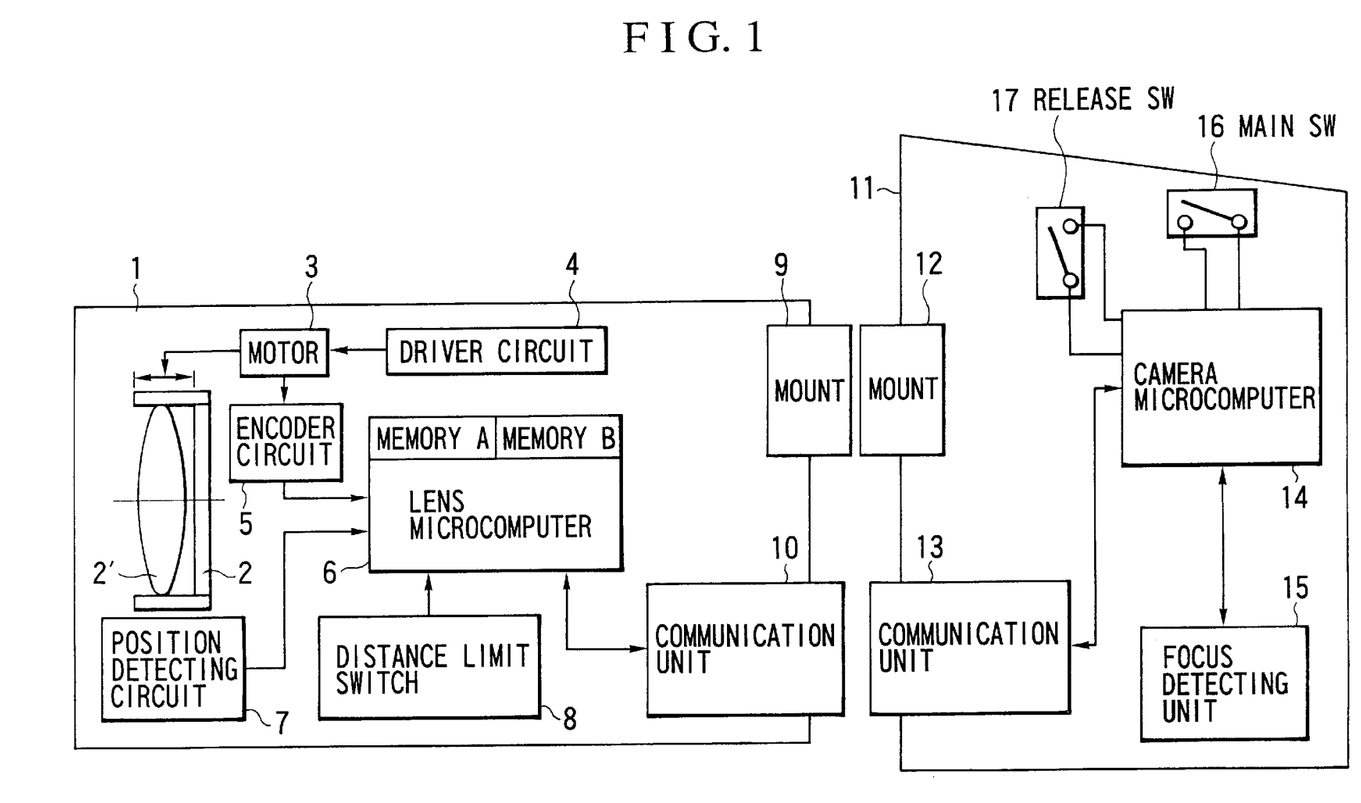
FIG. 1 is a block diagram schematically showing the arrangement of an interchangeable-lens type camera according to a first embodiment of this invention.

FIG. 1 is a diagram concerned with an automatic focusing device according to a first embodiment of this invention and schematically shows, in block diagram, the arrangement in which the automatic focusing device is applied to an interchangeable lens of an AF single-lens reflex type camera system.

Referring to FIG. 1, an interchangeable lens 1 is provided with a built-in actuator. A focusing unit 2 includes a focusing lens 2'. A motor 3 is arranged to drive the focusing unit 2 to perform focusing. A driver circuit 4 is arranged to turn on and off the motor 3 and to vary the speed of the driving action on the focusing unit 2 by varying an input to the motor 3. An encoder circuit 5 is arranged to read the driving speed and driving amount of the motor 3 or those of the focusing unit 2. A lens microcomputer 6 is arranged to perform control over all actions of the interchangeable lens 1. A position detecting circuit 7 is arranged to detect the absolute position of the focusing unit 2. A distance limit switch 8 is arranged to limit the moving area of the focusing unit 2. A lens mount 9 is provided for mounting the interchangeable lens 1 on a camera body 11. A lens communication unit 10 is provided with a plurality of electrical contacts for communication with a camera microcomputer 14.

The camera body 11 is provided with a camera mount 12 for coupling with the lens mount 9. A camera communication unit 13 is provided with a plurality of contacts for communication with the lens microcomputer 6. The camera microcomputer 14 is arranged to perform control over all actions of the camera body 11. A focus detecting unit 15 is arranged to measure through the interchangeable lens 1 a distance to an object to be photographed. A main switch 16 on the side of the camera is arranged to turn on and off a power supply provided for the camera and the lens. Reference numeral 17 denotes a shutter release switch.

Figure 2:
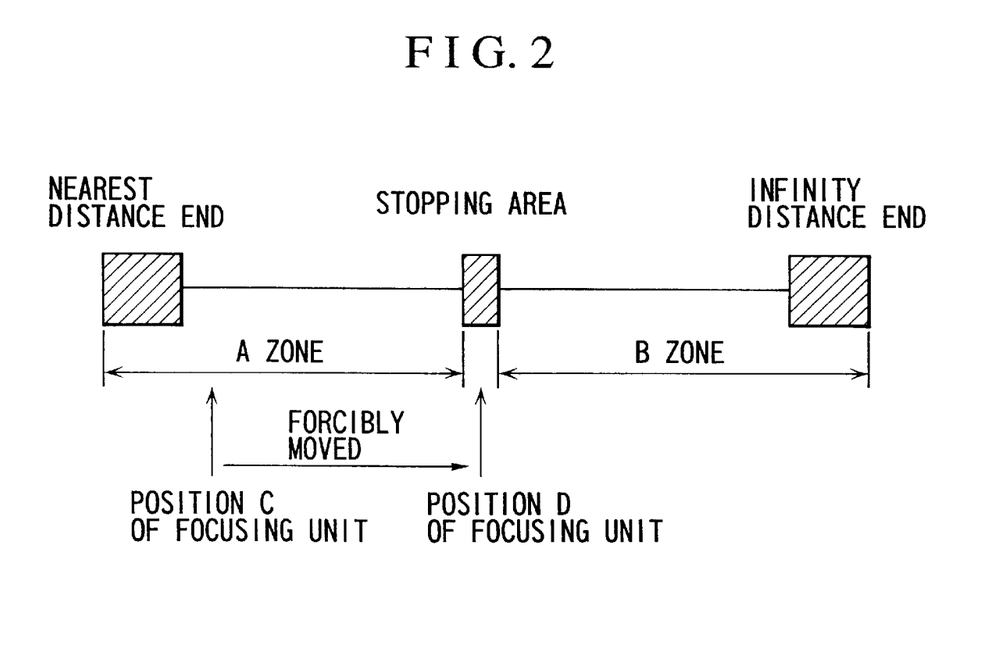
FIG. 2 shows areas set within a moving range of a focusing unit.

FIG. 2 shows areas to be used by the position detecting circuit 7 shown in FIG. 1 in detecting the absolute position of the focusing unit 2.

Referring to FIG. 2, when the distance limit switch 8 is in its on-state while the main switch 16 is in its on-state, an A zone becomes an area excluded from a movable area of the focusing unit 2, i.e., a movement inhibiting area. If the position of the focusing unit 2 is within the A zone under this condition, the focusing unit 2 is forcibly moved up to a stopping area set at a boundary between the A zone and a B zone, when the distance limit switch 8 is turned on from its off-state.

Then, while the distance limit switch 8 remains in its on-state, the focusing unit 2 is allowed to be moved within the B zone which extends from an infinity distance end to the stopping area, in other words, the B zone becomes a movement allowing area.

When the distance limit switch 8 is in its off-state, the focusing unit 2 is movable to any point between a nearest distance end and the infinity distance end.

Referring to FIGS. 1 and 2, when the lens 1, i.e., the interchangeable lens 1, is mounted on the camera body 11 through the lens mount 9 and the camera mount 12, the camera microcomputer 14 remains in a standby state until it is instructed to start automatic focusing (hereinafter referred to as AF for short). The start of AF is made in association with the first stroke of an operation performed on the release switch 17.

When the main switch 16 is turned on, the lens microcomputer 6 confirms that the lens 1 is mounted on the camera body 11. The lens microcomputer 6 then makes a check for the state of the distance limit switch 8. If the distance limit switch 8 is found to be in its off-state, the lens microcomputer 6 takes no action. If the distance limit switch 8 is found to be in its on-state, however, the lens microcomputer 6 acts to find the absolute position of the focusing unit 2 from an output value of the position detecting circuit 7. If the focusing unit 2 is found to be at a position C in the A zone shown in FIG. 2, the lens microcomputer 6 promptly causes the driver circuit 4 and the motor 3 to forcibly move the focusing unit 2 to a position D in the stopping area shown in FIG. 2. In this instance, the motor 3 is caused to rotate at a maximum speed. Further, even if there is any focusable object within the A zone in this instance, the existence of such an object is ignored.

Upon receipt of an instruction for a start of AF with the release switch 17 operated to its first stroke position, the camera microcomputer 14 requests the lens microcomputer 6 through the camera communication unit 13 and the lens communication unit 10 to send data of varied kinds related to optical matters. In response to the request, the lens microcomputer 6 sends the data requested to the camera microcomputer 14. Upon receipt of the data, the camera microcomputer 14 stores the optical data of varied kinds in an internal memory. Then, the camera microcomputer 14 computes a speed at which the focusing unit 2 is to be driven, on the basis of focusing sensitivity data included in the data stored.

The camera microcomputer 14 sends to the lens microcomputer 6 the computed driving speed of the focusing unit 2. Upon receipt of the computed speed data, the lens microcomputer 6 stores the data in its internal memory.

The camera microcomputer 14 next computes a distance to the photographing object on the basis of an output obtained from the focus detecting unit 15 and then computes a moving amount to which the focusing unit 2 is to be moved. The computed moving amount is sent to the lens microcomputer 6 along with a driving instruction through the camera communication unit 13 and the lens communication unit 10. Upon receipt of the communication, the lens microcomputer 6 examines the contents of it to derive therefrom the direction in which the focusing unit 2 is to be driven and an amount to which the focusing unit 2 is to be moved. The lens microcomputer 6 then causes the driver circuit 4 and the motor 3 to start moving the focusing unit 2.

The lens microcomputer 6 checks the state of the distance limit switch 8 to find if it is necessary to limit the movement of the focusing unit 2. If the moving direction of the focusing unit 2 is toward the nearest distance end and the movement of the focusing unit 2 should be limited, the focusing unit 2 is stopped from moving at the stopping area shown in FIG. 2. If the movement of the focusing unit 2 should not be limited, the focusing unit 2 is brought to a stop at the nearest distance end shown in FIG. 2.

Figure 3:
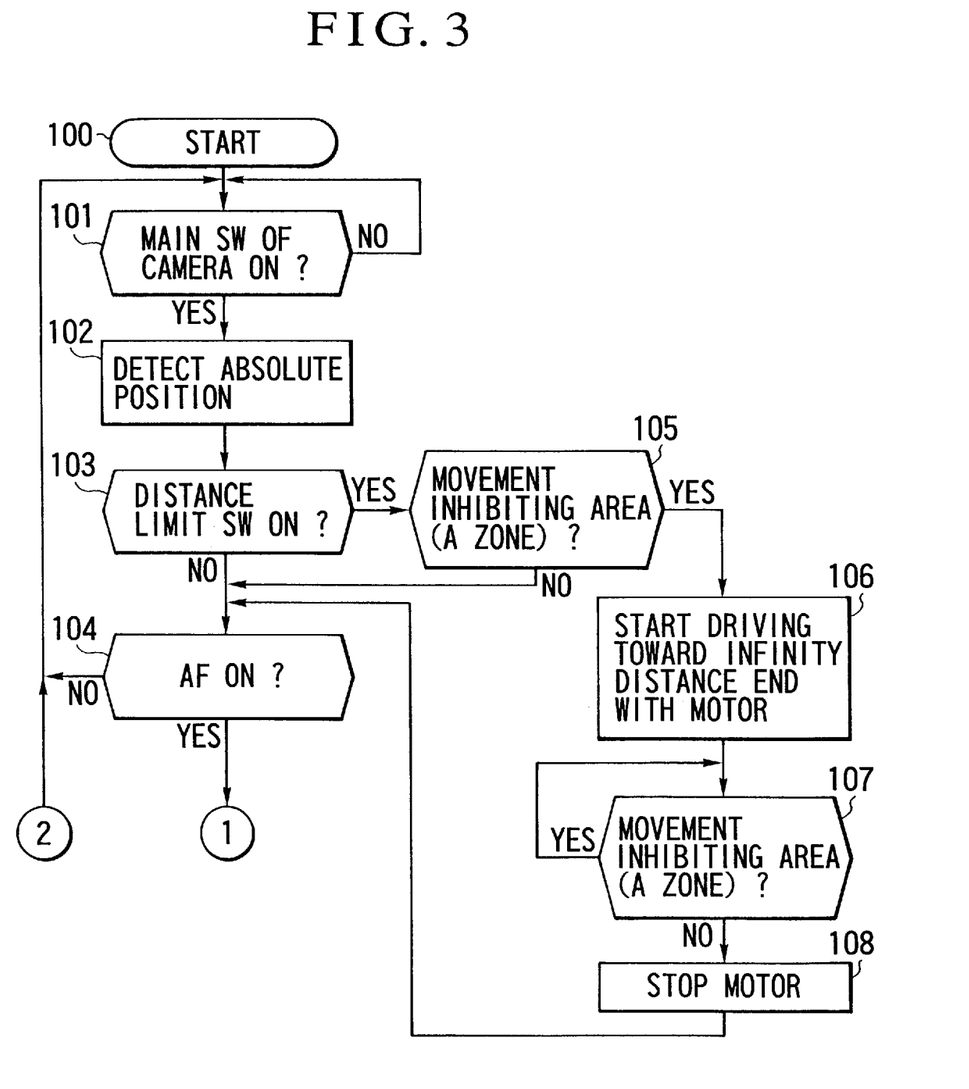
FIG. 3 is a flow chart showing part of an operation of a lens microcomputer shown in FIG. 1.
Figure 4:
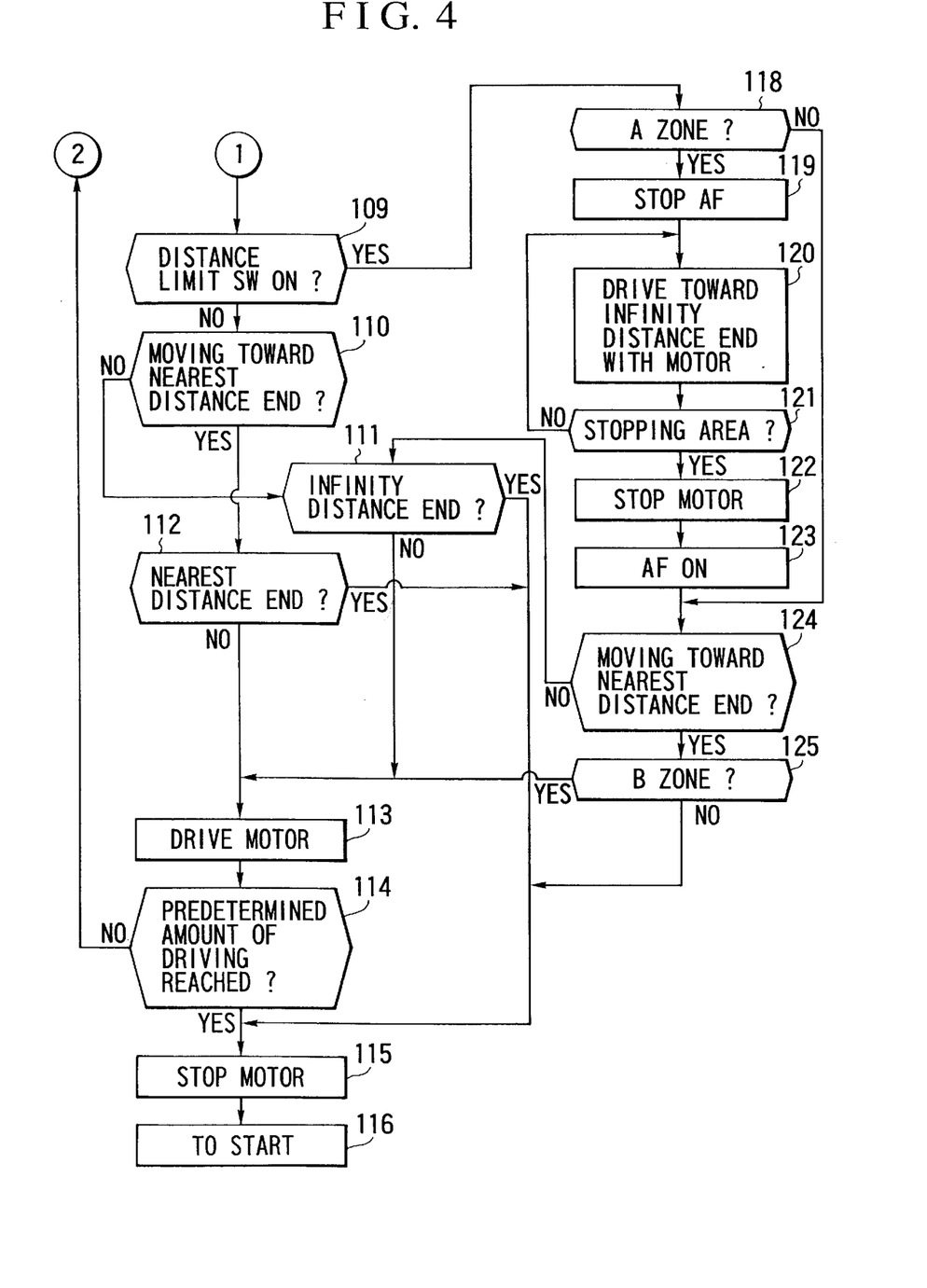
FIG. 4 is a flow chart showing part of the operation of the lens microcomputer shown in FIG. 1.

FIGS. 3 and 4 are flow charts showing the flow of the above-stated operation of the lens microcomputer 6. The flow of operation is described as follows.

Referring to FIG. 3, with the interchangeable lens 1 mounted on the camera body 11 through the lens mount 9 and the camera mount 12, the flow proceeds to a step 101 to wait until the main switch 16 is turned on. When the main switch 16 is turned on, the flow proceeds to a step 102. At the step 102, the lens microcomputer 6 detects the absolute position of the focusing unit 2 on the basis of the output of the position detecting circuit 7. The position detected is stored in the internal memory. At a step 103, a check is made for the state of the distance limit switch 8. If the distance limit switch 8 is found to be in its on-state, the flow proceeds to a step 105. At the step 105, the output value of the position detecting circuit 7 stored in the internal memory is checked to find if the position of the focusing unit 2 is within the movement inhibiting area (A zone). If so, the flow proceeds to a step 106. At the step 106, the focusing unit 2 is immediately caused to move toward the infinity distance end through the motor 3. At a step 107, the output of the position detecting circuit 7 is checked to find if the focusing unit 2 is still within the movement inhibiting area (A zone). In other words, the focusing unit 2 is driven until it moves out of the movement inhibiting area (A zone), i.e., it reaches the stopping area. Upon arrival of the focusing unit 2 at the stopping area, the flow proceeds to a step 108 to stop the motor 3 from rotating. The flow then proceeds to a step 104.

If the distance limit switch 8 is found to be in its off-state or if the position of the focusing unit is not in the movement inhibiting area (A zone) although the distance limit switch 8 is in its on-state, the flow proceeds from the step 103 or 105 to the step 104. At the step 104, the lens microcomputer 6 makes a check to find if the function of AF (automatic focusing) is on. If not, the flow returns to the step 101.

If the AF function is found to be on at the step 104, the flow proceeds to a step 109 which is shown in FIG. 4. At the step 109, a check is made again for the state of the distance limit switch 8. If the distance limit switch 8 is found to be in its on-state, the flow proceeds to a step 118. At the step 118, a check is made to find if the position of the focusing unit 2 is in the movement inhibiting area (A zone). If so, the flow proceeds to a step 119. If not, the focusing unit 2 is considered to be within the movement allowing area (B zone), and the flow proceeds to a step 124.

At the step 119, the AF function is brought to a stop. At the next step 120, the motor 3 is caused to forcibly drive the focusing unit 2 toward the infinity distance end. At a step 121, a check is made to find if the focusing unit 2 has reached the stopping area. If so, the flow proceeds to a step 122 to bring the rotation of the motor 3 to a stop. After that, the flow proceeds to a step 123 to turn on the AF function once again.

At the next step 124, information received through communication with the camera microcomputer 14 is checked for the direction in which the focusing unit 2 is to be moved. If the moving direction is found to be toward the nearest distance end, the flow proceeds to a step 125. At the step 125, a check is made, on the basis of the absolute position of the focusing unit 2 detected at the step 102, to find if the focusing unit 2 is within the movement allowing area (B zone). If so, the flow proceeds to a step 113. At the step 113, the motor 3 is driven to start moving the focusing unit 2. At a step 114, a check is made to find if the moving amount of the focusing unit 2 has reached a predetermined moving amount which is obtained through communication from the camera microcomputer 14. If not, the flow returns to the step 101 to cause the position detecting circuit 7 to update the absolute position of the focusing unit 2. If so, the flow proceeds to a step 115 to bring the rotation of the motor 3 to a stop. At a step 116, with the focusing unit 2 thus stopped from moving, the flow returns to the step 101.

Further, if the absolute position of the focusing unit 2 is found at the step 125 to be not in the movement allowing area (B zone), the flow proceeds to the step 115 to immediately bring the motor 3 to a stop. Then, the flow returns to the step 100 through the step 116.

In a case where the focusing unit 2 is found at the step 124 to be moving toward the infinity distance end, the flow proceeds to a step 111. At the step 111, a check is made, on the basis of the absolute position of the focusing unit 2 detected at the step 101, to find if the focusing unit 2 is at the infinity distance end. If not, the flow proceeds to the step 113 to cause the focusing unit 2 to start moving by driving the motor 3. At the step 114, a check is made to find if the moving amount of the focusing unit 2 has reached the predetermined moving amount obtained through communication from the camera microcomputer 14. If not, the flow returns to the step 101 to cause the position detecting circuit 7 to update the absolute position of the focusing unit 2. If so, the flow proceeds to the step 115 to stop the focusing unit 2 from moving, and then returns to the step 101 through the step 116.

Further, if the distance limit switch 8 is found at the step 109 to be in its off-state, the flow proceeds to a step 110. At the step 110, a check is made, on the basis of the contents of communication from the camera microcomputer 14, to find if the focusing unit 2 is moving toward the nearest distance end. If so, the flow proceeds to a step 112. At the step 112, a check is made, on the basis of the absolute position of the focusing unit 2 detected at the step 101, to find if the focusing unit 2 is at the nearest distance end. If not, the flow proceeds to the step 113 to cause the motor 3 to start moving the focusing unit 2. At the next step 114, a check is made to find if the moving amount of the focusing unit 2 has reached the predetermined moving amount obtained from the camera microcomputer 14 through communication. If not, the flow returns to the step 101 to cause the position detecting circuit 7 to update the absolute position of the focusing unit 2. If so, the flow proceeds to the step 115 to stop the focusing unit 2 from moving by bringing the rotation of the motor 3 to a stop. The flow then returns to the step 101 through the step 116.

Further, at the step 110, if the focusing unit 2 is found to be moving toward the infinity distance end, the flow proceeds to the step 111. At the step 111, a check is made, on the basis of the absolute position of the focusing unit 2 detected by the step 101, to find if the focusing unit 2 is at the infinity distance end. If not, the flow proceeds to the step 113 to cause the motor 3 to start moving the focusing unit 2. At the step 114, a check is made to find if the moving amount of the focusing unit 2 has reached the predetermined moving amount obtained through communication from the camera microcomputer 14. If not, the flow returns to the step 101 to cause the position detecting circuit 7 to update the absolute position of the focusing unit 2. If so, the flow proceeds to the step 115 to stop the focusing unit 2 from moving by bringing the rotation of the motor 3 to a stop. The flow then returns to the step 101 through the step 116.

If the absolute position of the focusing unit 2 is found, at the step 111 or 112, to be at the infinity distance end or the nearest distance end, respectively, the flow proceeds to the step 115 to stop the focusing unit 2 from moving by bringing the rotation of the motor 3 to a stop, and then returns to the step 101 through the step 116.

According to the arrangement of the first embodiment, if the position of the focusing unit 2 is within the movement inhibiting area (A zone), the focusing unit 2 is forcibly moved to the movement allowing area (B zone), when the output of the distance limit switch 8 changes from an off-state to an on-state or when the main switch 16 is turned on while the distance limit switch 8 is in its on-state. This arrangement effectively eliminates such shortcomings of the prior art that a long time is required before the focusing unit 2 reaches the movement allowing area (B zone) and that a manual operation is necessary. This arrangement gives a great advantage particularly in cases where the lens has a high focusing sensitivity or a long distance between the nearest distance end and the infinity distance end. In short, the arrangement described above gives an automatic focus control system which is capable of smoothly operating at a high speed.

In the first embodiment, the lens microcomputer 6 is arranged to cause the focusing unit 2 to be forcibly moved depending on the state of the distance limit switch 8. A second embodiment of this invention is arranged, on the other hand, to have a mode of causing the focusing unit 2 to move by the camera body and a mode of controlling the moving action of the focusing unit 2 in a manner other than forcibly moving the focusing unit 2. Since the electrical circuit arrangement of the second embodiment is identical with that of the first embodiment shown in FIG. 1, the details of the arrangement are therefore omitted from the following description of the second embodiment of this invention.

Referring to FIG. 2 when the distance limit switch 8 is in its on-state, the A zone is excluded from the movable area of the focusing unit 2. Therefore, if a driving instruction is received from the camera microcomputer 14 when the position of the focusing unit 2 is within the A zone, the focusing unit 2 is controlled by the lens microcomputer 6 in such a way as to be movable only toward the infinity distance end.

When the distance limit switch 8 is in its on-state, an area between the infinity distance end and the stopping area, i.e., the B zone, is considered as the movement allowing area of the focusing unit 2.

When the distance limit switch 8 is in its on-state, the focusing unit 2 is allowed to move only in one direction, which is from the nearest distance end toward the infinity distance end.

When the distance limit switch 8 is in its off-state, the focusing unit 2 can be moved to any positions between the nearest distance end and the infinity distance end.

Referring to FIGS. 1 and 2, when the interchangeable lens 1 is mounted on the camera body 11 through the lens mount 9 and the camera mount 12, the operation of the camera microcomputer 14 remains in a standby state until an AF starting instruction is given.

When the AF starting instruction is given from outside, the camera microcomputer 14 requests the lens microcomputer 6 through the camera communication unit 13 and the lens communication unit 10 to send data of varied kinds related to optical matters. In response to the request, the lens microcomputer 6 sends the requested data to the camera microcomputer 14. Upon receipt of the data, the camera microcomputer 14 stores the optical data of varied kinds in its internal memory. The camera microcomputer 14 then computes a speed at which the focusing unit 2 is to be driven on the basis of focusing sensitivity data included in the data stored.

The camera microcomputer 14 sends to the lens microcomputer 6 the computed driving speed of the focusing unit 2. Upon receipt of the computed speed data, the lens microcomputer 6 stores the data in its internal memory.

The camera microcomputer 14 next computes a distance to the photographing object on the basis of an output obtained from the focus detecting unit 15 and then computes a moving amount to which the focusing unit 2 is to be moved. The computed moving amount is sent to the lens microcomputer 6 along with a driving instruction through the camera communication unit 13 and the lens communication unit 10. Upon receipt of the communication input, the lens microcomputer 6 examines the contents of it to derive therefrom the direction in which the focusing unit 2 is to be driven and an amount to which the focusing unit 2 is to be moved. The lens microcomputer 6 then begins to move the focusing unit 2 through the driver circuit 4 and the motor 3.

The lens microcomputer 6 checks the state of the distance limit switch 8 to find if it is necessary to limit the movement of the focusing unit 2. If the moving direction of the focusing unit 2 is a direction toward the nearest distance end and the movement of the focusing unit 2 should be limited, the focusing unit 2 is stopped from moving at the stopping area shown in FIG. 2. If not, the focusing unit 2 is brought to a stop at the nearest distance end shown in FIG. 2.

Figure 5:
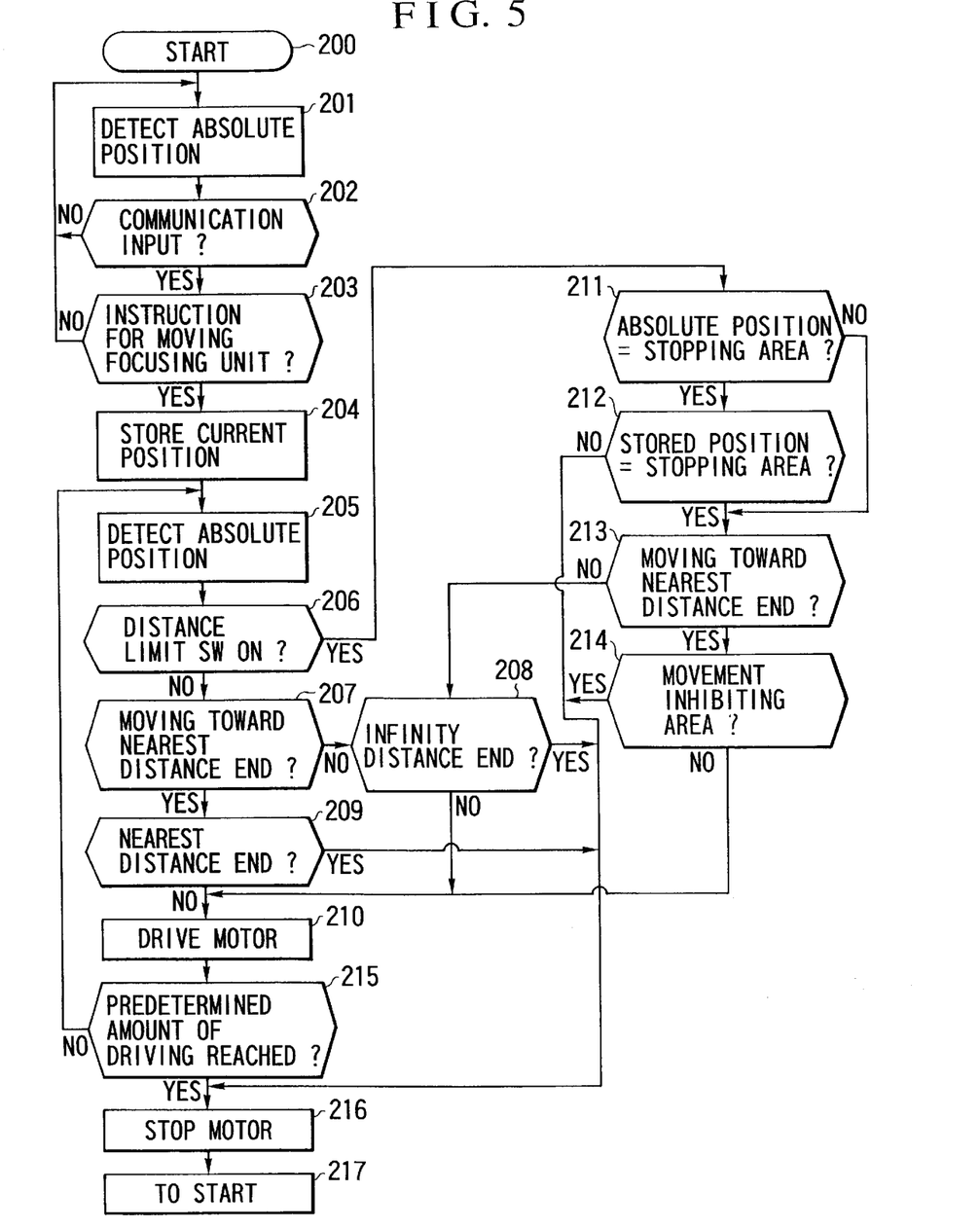
FIG. 5 is a flow chart showing an operation of a lens microcomputer according to a second embodiment of this invention.

FIG. 5 is a flow chart showing the flow of the above-stated operation of the lens microcomputer 6 in the second embodiment of this invention. The flow of operation is described with reference to FIG. 5 as follows.

Referring to FIG. 5, when the lens 1 is mounted on the camera body 11 through the lens mount 9 and the camera mount 12, the flow proceeds to a step 201. At the step 201, the lens microcomputer 6 detects the absolute position of the focusing unit 2 on the basis of the output of the position detecting circuit 7 and stores it in its internal memory A. At a step 202, a check is made for any communication input from the camera microcomputer 14. If there is a communication input, the flow of operation proceeds to a step 203. If not, the flow returns to the step 201. At the step 203, if the input is found to be not a moving instruction for the focusing unit 2, the flow of operation returns also to the step 201. The moving instruction for the focusing unit 2 is to be given from the camera microcomputer 14 for moving the focusing unit 2 for focus adjustment as a result of a focus detecting process performed on the side of the camera body.

If a communication input is found at the step 202 to be received and found at the step 203 to be the moving instruction for the focusing unit 2 from the camera microcomputer 14, the flow proceeds from the step 203 to a step 204. At the step 204, the current position of the focusing unit 2 is stored in an internal memory B of the lens microcomputer 6. The value thus stored in the internal memory B is kept in storage until the driving action comes to an end. At a step 205, the lens microcomputer 6 detects the absolute position of the focusing unit 2 and stores it in the memory A which is used at the step 201. At the next step 206, a check is made for the state of the distance limit switch 8. If the distance limit switch 8 is found to be in its on state, the flow proceeds to a step 211. At the step 211, a check is made to find if the absolute position is in the stopping area shown in FIG. 2. If so, the flow proceeds to a step 212. At the step 212, a check is made to find if the position stored at the step 204 is also in the stopping area. If not, the flow proceeds to a step 216 to immediately stop the motor 3 from rotating. The flow then returns to the step 201 through a step 217. The flow is thus arranged to cause the position of the focusing unit 2 obtained at the step 204 before driving it to be eventually found at the step 212 to be in the stopping area.

When the position of the focusing unit 2 stored at the step 204 is found at the step 212 to be in the stopping area, the flow proceeds to a step 213. At the step 213, the moving direction for the focusing unit 2 is confirmed from the contents of communication conducted with the camera microcomputer 14. If the moving direction is toward the nearest distance end, the flow proceeds to a step 214. At the step 214, a check is made to find if the current absolute position of the focusing unit 2 detected at the step 205 is in the movement inhibiting area (A zone). If so, the flow proceeds to the step 216 to stop the motor 3 from rotating, and then returns to the step 201 through the step 217. In other words, driving the focusing unit 2 toward the nearest distance end according to the result of AF is inhibited within the movement inhibiting area (A zone).

At the step 214, if the current absolute position of the focusing unit 2 is found to be in an area other than the movement inhibiting area (A zone), the flow proceeds to a step 210. At the step 210, the motor 3 is driven to start moving the focusing unit 2. At the next step 215, a check is made to find if the moving amount of the focusing unit 2 has reached a predetermined moving amount obtained through the communication from the camera microcomputer 14. If not, the flow returns to the step 205 to cause the position detecting circuit 7 to update the absolute position of the focusing unit 2. If so, the flow proceeds to the step 216 to stop the motor 3 from rotating and the focusing unit 2 ceases to be moved. The flow returns to the step 201 through the step 217.

At the step 211, as mentioned above, the absolute position of the focusing unit 2 stored at the step 205 is checked to find if it is in the stopping area and in what position focus detection is made. If the absolute position of the focusing unit 2 is found to be in the stopping area, the flow proceeds to a step 212. If the absolute position is found to be in any area that is other than the stopping area, the flow jumps to the step 213. At the step 212, a check is made to find if the movement of the focusing unit 2 has begun from the stopping area and if the moving action of the focusing unit 2 should be brought to a stop. These steps are provided, because the step 212 must be ignored if the current absolute position of the focusing unit 2 is in any area other than the stopping area.

The reason for the provision of these steps is as follows. If a focus detecting action is performed for any object located at a far distance exceeding the stopping area when the position of the focusing unit 2 is near to the nearest distance end, the reliability of the focus detection would degrade. Therefore, to avoid it, the focus detection is made again by temporarily bringing the movement of the focusing unit 2 to a stop.

At the step 213, the moving direction of the focusing unit 2 is confirmed from the contents of a communication input from the camera microcomputer 14. If the moving direction is toward the infinity distance end, the flow proceeds to a step 208 to find if the absolute position of the focusing unit 2 detected at the step 205 is at the infinity distance end. If not, the flow proceeds to the step 210 to drive the motor 3 to start moving the focusing unit 2. At the step 215, a check is made to find if the moving amount of the focusing unit 2 has reached the predetermined moving amount obtained through communication from the camera microcomputer 14. If not, the flow returns to the step 205 to cause the position detecting circuit 7 to update the absolute position of the focusing unit 2. If so, the flow proceeds to the step 216 to stop the motor from rotating to bring the movement of the focusing unit 2 to a stop. The flow then returns to the step 201 through the step 217.

The actions to be performed when the distance limit switch 8 is in its on-state as described above are summarized as follows.

In a case where the initial position of the focusing unit 2 is in the movement inhibiting area (A zone), the steps 201 to 206, 211 and 213 are executed. Then, if the moving direction of the focusing unit 2 is found to be toward the nearest distance end according to the result of focus detection, the steps 213, 214 and 216 are executed. In this instance, the focusing unit 2, i.e., the focusing lens, is not moved. In a case where the result of focus detection indicates that the focusing unit 2 must be moved toward the infinity distance end, the flow proceeds to the steps 213, 208, 210 and 215 to drive the focusing unit 2 according to the result of focus detection. Therefore, even if the distance limit switch 8 is in its on-state while the current position of the focusing unit 2 is in the movement inhibiting area (A zone), focusing can be carried out on a photographing object which is focusable by moving the focusing unit 2 toward the infinity distance end. However, focusing is inhibited on any object that is focusable by moving the focusing unit 2 toward the nearest distance end.

In a case where the position of the focusing unit 2 is in the movement inhibiting area (A zone) while the focus detection is made for an object located in the movement allowing area (B zone), on the other hand, this situation is judged at the step 211 to indicate that the focusing unit 2 has reached the stopping area while the focusing unit 2 is in process of moving toward the infinity distance end. In this case, since the position stored is found at the step 212 to be not in the stopping area, the flow proceeds to the step 216 to bring the focusing unit 2 to a stop.

As described above, if the focusable position of the photographing object is judged to be closer to the infinity distance end than the current position of the focusing unit 2 according to the result of a focus detecting action newly taken after the focusing unit 2 is moved to the stopping area, the steps 211, 212, 213, 208 and 210 are executed to bring the lens in focus on the object located in the movement allowing area (B zone). On the other hand, if the position of the object is judged to be closer to the nearest distance end than the current position of the focusing unit 2 according to the result of focus detection, the steps 214 and 216 are executed to inhibit focusing within the movement inhibiting area (A zone).

Further, in a case where the initial position of the focusing unit 2 is within the movement allowing area (B zone), the steps 206, 211, 213, 208 and 210 or 206, 211, 213, 214 and 210 are executed to bring the lens into focus on a photographing object located in the movement allowing area (B zone). In this case, when the focusing unit 2 is moved up to the stopping area, the steps 211, 212 and 216 are executed to inhibit focusing on an object located within the movement inhibiting area (A zone).

At the step 206, if the distance limit switch 8 is found to be in its off-state, the flow proceeds to a step 207 to check the contents of communication from the camera microcomputer 14 to find the moving direction of the focusing unit 2. If the moving direction is found to be toward the infinity distance end, the flow proceeds to the step 208. If the moving direction is found to be toward the nearest distance end, the flow proceeds to a step 209. At the step 209, a check is made to find if the absolute position of the focusing unit 2 detected at the step 205 is the nearest distance end. If not, the flow proceeds to the step 210 to drive the motor 3 to start moving the focusing unit 2. At the next step 215, a check is made to find if the moving amount of the focusing unit 2 has reached a predetermined moving amount obtained through communication from the camera microcomputer 14. If not, the flow returns to the step 205 to cause the position detecting circuit 7 to update the absolute position of the focusing unit 2. If so, the flow proceeds to the step 216 to bring the rotation of the motor 3 to a stop and to stop the focusing unit 2 from moving. Then, the flow returns to the step 201 through the step 217.

Further, if the absolute position of the focusing unit is found at the step 208 or 209 to be at the infinity distance end or at the nearest distance end, respectively, the flow proceeds to the step 216 to stop the motor 3 from rotating and the focusing unit 2 from moving. The flow then returns to the step 201 through the step 217.

In a case where the distance limit switch 8 is turned on from its off-state while the position of the focusing unit is in the movement inhibiting area (A zone), the focusing unit 2 is forcibly brought to the stopping area set between the movement inhibiting area (A zone) and the movement allowing area (B zone). However, this arrangement of course may be changed to forcibly bring the focusing unit 2 to any position within the movement allowing area (B zone).

I claim:

1. A focus adjusting apparatus comprising:
   a) a motor as a drive source;
   b) a focus unit driven by said motor and having at least one focus lens;
   c) a focus detecting device which performs focus detection;
   d) an area setting device which sets a movement inhibiting area in which said focus unit cannot move on the basis of a result of focus detection by said focus detecting device;
   e) a position detecting device which detects a position of said focus unit; and
   f) a motor control device which, when it is detected by said position detecting device that said focus unit is within the movement inhibiting area set by said area setting device, controls said motor to be forcedly driven until said focus unit moves out of the movement inhibiting area, despite the result of focus detection by said focus detecting device, and, when said focus unit moves out of said movement inhibiting area, controls said motor to stop, and after said focus unit moves out of said movement inhibiting area, controls said motor to drive on the basis of the focus detection result by said focus detecting device.

2. A focus adjusting apparatus according to claim 1, wherein said movement inhibiting area is set in an area in which said focus unit is movable and an in-focus condition can be obtained with respect to an object of short distance.

3. A focus adjusting apparatus according to claim 1, wherein, said motor control device, when it is detected that said focus unit is not within said movement inhibiting area set by said area setting device, controls said motor to drive on the basis of the focus detection result by said focus detecting device.

4. An optical apparatus comprising:
   a) a motor as a drive source;
   b) a focus unit driven by said motor and having at least one focus lens;
   c) a focus detecting device which performs focus detection;
   d) an area setting device which sets a movement inhibiting area in which said focus unit cannot move on the basis of a result of focus detection by said focus detecting device;
   e) a position detecting device which detects a position of said focus unit; and
   f) a motor control device which, when it is detected by said position detecting device that said focus unit is within the movement inhibiting area set by said area setting device, controls said motor to be forcedly driven until said focus unit moves out of the movement inhibiting area, despite the result of focus detection by said focus detecting device, and, when said focus unit moves out of said movement inhibiting area, controls said motor to stop, and after said focus unit moves out of said movement inhibiting area, controls said motor to drive on the basis of the focus detection result by said focus detecting device.

5. An optical apparatus according to claim 4, wherein said movement inhibiting area is set in an area in which said focus unit is movable and an in-focus condition can be obtained with respect to an object of short distance.

6. An optical apparatus according to claim 4, wherein, said motor control device, when it is detected that said focus unit is not within said movement inhibiting area set by said area setting device, immediately controls said motor to drive on the basis of the focus detection result by said focus detecting device.

7. A focus adjusting apparatus comprising:
   a) a motor as a drive source;
   b) a focus unit driven by said motor and having at least one focus lens;
   c) a focus detecting device which performs focus detection;
   d) an area setting device which sets a movement inhibiting area in which said focus unit cannot move on the basis of a result of focus detection by said focus detecting device;
   e) a position detecting device which detects a position of said focus unit; and
   f) a motor control device which, when it is detected by said position detecting device that said focus unit is within the movement inhibiting area set by said area setting device, controls said motor to drive only in a direction to move said focus unit out of said movement inhibiting area on the basis of the focus detection result by said focus detecting device and, when said focus unit moves out of said movement inhibiting area, controls said motor to stop, and after said focus unit has moved out of said movement inhibiting area, controls said motor to drive again on the basis of the focus detection result by said focus detecting device.

8. A focus adjusting apparatus according to claim 7, wherein said movement inhibiting area is set in an area in which said focus unit is movable and an in-focus condition can be obtained with respect to an object of short distance.

9. A focus adjusting apparatus according to claim 1, wherein, said motor control device, when it is detected that said focus unit is not within said movement inhibiting area set by said area setting device, immediately controls said motor to drive on the basis of the focus detection result by said focus detecting device.

* * * * *

UNITED STATES PATENT AND TRADEMARK OFFICE
CERTIFICATE OF CORRECTION

PATENT NO. : 5,899,586
DATED : May 4, 1999
INVENTOR(S) : Akihiro Kawanami

It is certified that error appears in the above-identified patent and that said Letters Patent is hereby corrected as shown below:

Title page, after item "[22] Filed: Jan. 24, 1997" add the following:

[30] Foreign Application Priority Data
   Feb. 2, 1996 [JP] Japan.....................................8-039148

Signed and Sealed this

Twenty-seventh Day of June, 2000

Attest:

Q. TODD DICKINSON

*Attesting Officer*     *Director of Patents and Trademarks*